(12) United States Patent
Smeenk et al.

(10) Patent No.: US 7,401,396 B2
(45) Date of Patent: Jul. 22, 2008

(54) METHODS OF MAKING MICROSTRUCTURED LAMINA AND APPARATUS

(75) Inventors: Lars A. Smeenk, St. Paul, MN (US); Conrad V. Anderson, Minneapolis, MN (US); Nelson D. Sewall, Forest Lake, MN (US); Kenneth L. Smith, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/566,833

(22) Filed: Dec. 5, 2006

(65) Prior Publication Data

US 2007/0107191 A1 May 17, 2007

Related U.S. Application Data

(62) Division of application No. 10/383,039, filed on Mar. 6, 2003, now Pat. No. 7,174,619.

(51) Int. Cl.
*B23Q 3/00* (2006.01)

(52) U.S. Cl. ............... 29/467; 29/281.1; 29/283; 409/219; 83/86

(58) Field of Classification Search ........ 29/281.1, 29/283, 467, 464; 269/21; 264/1.1, 1.9; 409/219, 225; 414/902; 83/84–86, 93
See application file for complete search history.

(56) References Cited

U.S. PATENT DOCUMENTS

| | | | |
|---|---|---|---|
| 1,591,572 A | 7/1926 | Stimson | |
| 2,676,504 A * | 4/1954 | Brugge et al. | 269/8 |
| 3,463,478 A * | 8/1969 | Hennessey | 269/271 |
| 3,588,079 A | 6/1971 | Addy et al. | |
| 3,649,153 A | 3/1972 | Brudy | |
| 3,712,706 A | 1/1973 | Stamm | |
| 3,926,402 A | 12/1975 | Heenan | |
| 4,066,236 A | 1/1978 | Lindner | |
| 4,066,331 A | 1/1978 | Lindner | |
| 4,095,773 A | 6/1978 | Lindner | |
| 4,478,769 A | 10/1984 | Pricone et al. | |
| 4,486,363 A | 12/1984 | Pricone et al. | |
| 4,588,258 A | 5/1986 | Hoopman | |
| 4,601,110 A | 7/1986 | Donaldson | |
| 5,064,321 A * | 11/1991 | Barnes | 409/219 |
| 5,156,863 A | 10/1992 | Pricone et al. | |
| 5,793,015 A | 8/1998 | Walczyk | |
| 5,856,924 A | 1/1999 | Brost et al. | |
| 5,898,523 A | 4/1999 | Smith et al. | |
| 5,915,678 A | 6/1999 | Slocum et al. | |
| 5,981,032 A | 11/1999 | Smith et al. | |
| 6,010,609 A * | 1/2000 | Mimura et al. | 205/70 |
| 6,015,214 A | 1/2000 | Heenan et al. | |
| 6,159,407 A * | 12/2000 | Krinke et al. | 264/219 |
| 6,253,442 B1 | 7/2001 | Benson et al. | |
| 6,257,860 B1 | 7/2001 | Luttrell et al. | |
| 6,302,992 B1 | 10/2001 | Smith et al. | |
| 6,318,987 B1 * | 11/2001 | Luttrell et al. | 425/193 |

(Continued)

*Primary Examiner*—David P. Bryant
*Assistant Examiner*—Christopher M Koehler
(74) *Attorney, Agent, or Firm*—Carolyn A. Fischer

(57) ABSTRACT

The present invention relates to methods of making microstructured laminae for replication and apparatus. In a preferred embodiment, the invention relates to machining V-shaped grooves on individual lamina forming cube-corner microstructures.

20 Claims, 4 Drawing Sheets

U.S. PATENT DOCUMENTS 6,322,652 B1 11/2001 Paulson et al.
6,328,507 B1 12/2001 Shoda
7,174,619 B2 2/2007 Smeenk et al.

* cited by examiner

METHODS OF MAKING MICROSTRUCTURED LAMINA AND APPARATUS

CROSS REFERENCE TO RELATED APPLICATIONS

This application is a divisional of U.S. application Ser. No. 10/383,039 (2004/0175541), filed Mar. 6, 2003, now U.S. Pat. No. 7,174,619.

FIELD OF THE INVENTION

The present invention relates to methods of making microstructured lamina for replication and apparatus. In a preferred embodiment, the invention relates to machining V-shaped grooves on an individual lamina forming cube-corner microstructures.

BACKGROUND OF THE INVENTION

Retroreflective materials are characterized by the ability to redirect light incident on the material back toward the originating light source. This property has led to the widespread use of retroreflective sheeting for a variety of traffic and personal safety uses. Retroreflective sheeting is commonly employed in a variety of articles, for example, road signs, barricades, license plates, pavement markers and marking tape, as well as retroreflective tapes for vehicles and clothing.

Two known types of retroreflective sheeting are microsphere-based sheeting and cube corner sheeting. Microsphere-based sheeting, sometimes referred to as "beaded" sheeting, employs a multitude of microspheres typically at least partially embedded in a binder layer and having associated specular or diffuse reflecting materials (e.g., pigment particles, metal flakes or vapor coats, etc.) to retroreflect incident light. Due to the symmetrical geometry of beaded retroreflectors, microsphere based sheeting exhibits a relatively uniform total light return regardless of orientation, i.e. when rotated about an axis normal to the surface of the sheeting. Thus, such microsphere-based sheeting has a relatively low sensitivity to the orientation at which the sheeting is placed on a surface. In general, however, such sheeting has a lower retroreflective efficiency than cube corner sheeting.

Cube corner retroreflective sheeting typically comprises a thin transparent layer having a substantially planar front surface and a rear structured surface comprising a plurality of geometric structures, some or all of which include three reflective faces configured as a cube corner element. Cube corner retroreflective sheeting is commonly produced by first manufacturing a master mold that has a structured surface, such structured surface corresponding either to the desired cube corner element geometry in the finished sheeting or to a negative (inverted) copy thereof, depending upon whether the finished sheeting is to have cube corner pyramids or cube corner cavities (or both). The mold is then replicated using any suitable technique such as conventional nickel electroforming to produce tooling for forming cube corner retroreflective sheeting by processes such as embossing, extruding, or cast-and-curing. U.S. Pat. No. 5,156,863 (Pricone et al.) provides an illustrative overview of a process for forming tooling used in the manufacture of cube corner retroreflective sheeting. Known methods for manufacturing the master mold include pin-bundling techniques, direct machining techniques, and techniques that employ laminae.

In pin bundling techniques, a plurality of pins, each having a geometric shape such as a cube corner element on one end, are assembled together to form a master mold. U.S. Pat. No. 1,591,572 (Stimson) and U.S. Pat. No. 3,926,402 (Heenan) provide illustrative examples.

In the case of direct machining techniques, a series of grooves are formed in the surface of a planar substrate to form a master mold. In one well known technique, three sets of parallel grooves intersect each other at 60 degree included angles to form an array of cube corner elements, each having an equilateral base triangle (see U.S. Pat. No. 3,712,706 (Stamm)). In another technique, two sets of grooves intersect each other at an angle greater than 60 degrees and a third set of grooves intersects each of the other two sets at an angle less than 60 degrees to form an array of canted cube corner element matched pairs (see U.S. Pat. No. 4,588,258 (Hoopman)).

In techniques that employ laminae, a plurality of thin sheets (i.e. plates) referred to as laminae having geometric shapes formed on one longitudinal edge are assembled to form a master mold. Illustrative examples of techniques that employ laminae can be found in EP 0 844 056 A1 (Mimura); U.S. Pat. No. 6,015,214 (Heenan); U.S. Pat. No. 5,981,032 (Smith); U.S. Pat. No. 6,159,407 (Krinke) and U.S. Pat. No. 6,257,860 (Luttrell).

The base edges of adjacent cube corner elements of truncated cube corner arrays are typically coplanar. Other cube corner element structures, described as "full cubes" or "preferred geometry (PG) cube corner elements" typically do not have coplanar base edges. Such structures typically exhibit a higher total light return in comparison to truncated cube corner elements. Certain PG cube corner elements may be fabricated via direct machining techniques, as described in WO 00/60385. However, great care is required to maintain geometric accuracy with this multi-step fabrication process. Design constraints may also be evident in the resulting PG cube corner elements and/or arrangement of elements. By contrast, pin bundling and techniques that employ laminae allow for the formation of a variety of shapes and arrangements of PG cube corner elements. Unlike pin bundling, however, techniques that employ laminae also advantageously provide the ability to form relatively smaller PG cube corner elements.

Although the art generally describes methods of machining laminae suitable for use in making retroreflective sheeting, industry would find advantage in improved methods and apparatus.

SUMMARY OF THE INVENTION

In one embodiment, the invention relates to a method of machining a lamina comprising providing a lamina, kinematically positioning the lamina in a fixture such that a surface portion of the lamina is exposed, and machining the surface portion. The surface portion preferably spans the thickness of the lamina. Further, the invention is particularly advantageous for forming a plurality of grooves on the edge of a lamina wherein the grooves form cube corner microstructures.

In another embodiment, the invention relates to a method of assembling laminae including providing a lamina comprising a microstructured edge, kinematically positioning individual laminae in a fixture forming a stack, and maintaining the position of the lamina in the stack.

In another embodiment, the invention relates to a method of making laminae by providing at least two sheets, each having two major surfaces, machining (e.g. diamond) the major surfaces of the sheets to a uniform thickness, assembling the sheets into a stack and cutting two or more laminae concurrently from the stack preferably by means of electro-discharge machining.

In another embodiment, the invention relates to a method of replicating a master mold including providing a stack of laminae in a fixture wherein the stack comprises an exposed microstructured surface, attaching a conductive coversheet to the stack such that the fixture is covered and the structured surfaces exposed, and electroforming the exposed surface in a plating solution forming a replica. Preferably, the replica is removed from the stack prior to drying of the plating solution. Further, the method preferably comprises shrink fitting the coversheet.

In another embodiment, the invention relates to a fixture for lamina(e) comprising two opposing parallel surfaces connected by a perpendicular base support, said surfaces having an adjustable opening therebetween, a means for retracting and advancing at least one of the opposing surfaces for receipt of a lamina, and a means for kinematically positioning individual laminae. The fixture may optionally comprise a means for verifying the position of the lamina(e). The assembly fixture preferably further comprises a means for maintaining the position of the lamina(e) in the stack. Further, the precision of the position of each lamina relative to an adjacent lamina is at least 0.0001 inches (0.00254 mm).

For each of these embodiments, the lamina preferably has a thickness ranging from 0.001 inches (0.0254 mm) to 0.020 inches (0.508 mm) and more preferably from 0.003 inches (0.076 mm) to 0.010 inches (0.254 mm). Particularly for such thin laminae, it is preferred that the lamina is kinematically constrained in three degrees of freedom by the machining fixture and/or the assembly fixture such as by kinematic constraint of x translation, z translation, and rotation about y. The lamina and/or the fixture preferably comprise (e.g. three) non-planar protrusions suitable for kinematically positioning. The lamina is preferably non-kinematically constrained in the remaining three degrees of freedom such as by means of opposing vacuums or contact pressure provided by a moveable jaw.

The lamina comprises a machinable plastic or a machinable metal. Particularly for the assembly and replication of the assembled laminae (e.g. electroforming solution) preferably each lamina has a thickness tolerance (i.e. variation in thickness within a lamina) less than +/−0.002 inches (0.0508 mm) and more preferably less than +/−0.0002 (0.00508 mm). The thickness tolerance for a lamina employed in the manufacture of molds for retroreflective sheeting is more preferably less than +/−0.0001 inches (0.00254 mm). Further, the major surfaces of the lamina typically have a surface roughness of less than 0.000005 inches (0.000127 mm). In addition, the laminae of the assembled stack preferably vary in length by less than +/−0.0001 inches (0.00254 mm) and more preferably by less than 0.0002 inches (0.00508 mm).

DETAILED DESCRIPTION OF THE PREFERRED EMBODIMENT

The present invention discloses methods of machining a lamina, methods of assembling laminae forming a master mold, methods of making a laminae, and methods of replicating a master mold comprising a stack of laminae. The invention relates to lamina(e) as well as apparatus useful as fixtures suitable for use in machining and/or assembly of lamina(e). The invention relates to the practice of each of these embodiments alone as well as the practice of the various combinations of such embodiments.

The method of machining a lamina, method of assembling laminae, the fixture for machining and/or assembling the lamina(e), as well as the lamina, share a common feature of "kinematic positioning". As described for example in *Precision Machine Design*, Alexander Slocum, Prentice Hall, Englewood Cliffs, N.J., 1992, p. 352-354, "The principle of kinematic design, states that point contact should be established at the minimum number of points to constrain a body in the desired position and orientation (i.e. six minus the number of desired degrees of freedom)." Theoretically, a single point of contact cannot be achieved. Thus, the point of contact is a small area.

For the purposes of clarity, kinematic positioning of a lamina will be described with reference to a three-dimensional Cartesian coordinate system superimposed upon a lamina. However, it will be appreciated that kinematic positioning may be described using other coordinate systems or the lamina and/or fixture may be positioned in other orientations (e.g. vertical).

Figure 1:
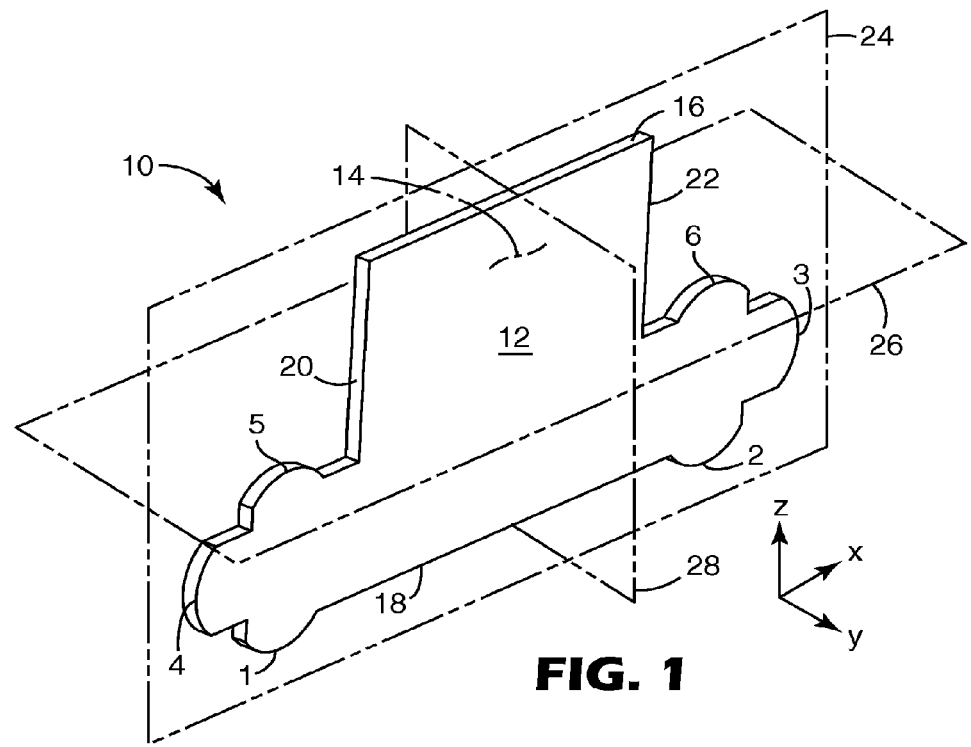
FIG. 1 is a trimetric view of a lamina.

With reference to FIG. 1, "position" refers to the coordinates along the x-axis, y-axis, and z-axis, whereas orientation refers to rotation about each of these axes. Accordingly, the lamina prior to placement in the machining or assembly fixture has the ability to move in six degrees of freedom, i.e. the x-axis, the y-axis, the z-axis, rotation about the x-axis, rotation about the y-axis and rotation about the z-axis.

In order to accommodate kinematic positioning, the lamina and/or the fixture (i.e. machining and/or assembly) preferably comprise protrusions. The protrusions are preferably rounded to minimize contact stress and deformation of the lamina in combination with minimizing the contact area between the lamina and the fixture. The invention will be described herein in greater detail with reference to a specific embodiment wherein the lamina alone comprises protrusions and the machining fixture and/or assembly fixture are designed to position the lamina via the protrusions of the lamina. In an alternative embodiment, however, the fixture(s) may solely comprise protrusions. In yet other embodiments, both the lamina and fixture comprise protrusions. Further, although rounded protrusions are preferred, other shaped protrusions as well as alternative placement of protrusions are also suitable provided that kinematic positioning of a lamina is achieved.

In one embodiment, the lamina preferably comprises at least three protrusions; for example one protrusion extending in the direction of the length (i.e. longest dimension in the plane of the lamina) and two protrusions extending in the direction of the height (i.e. shortest dimension in the plane of the lamina). The lamina may further comprise additional protrusions as well for applying precisely directed force in opposing directions to each of the protrusions that contact the fixture.

Figure 2:
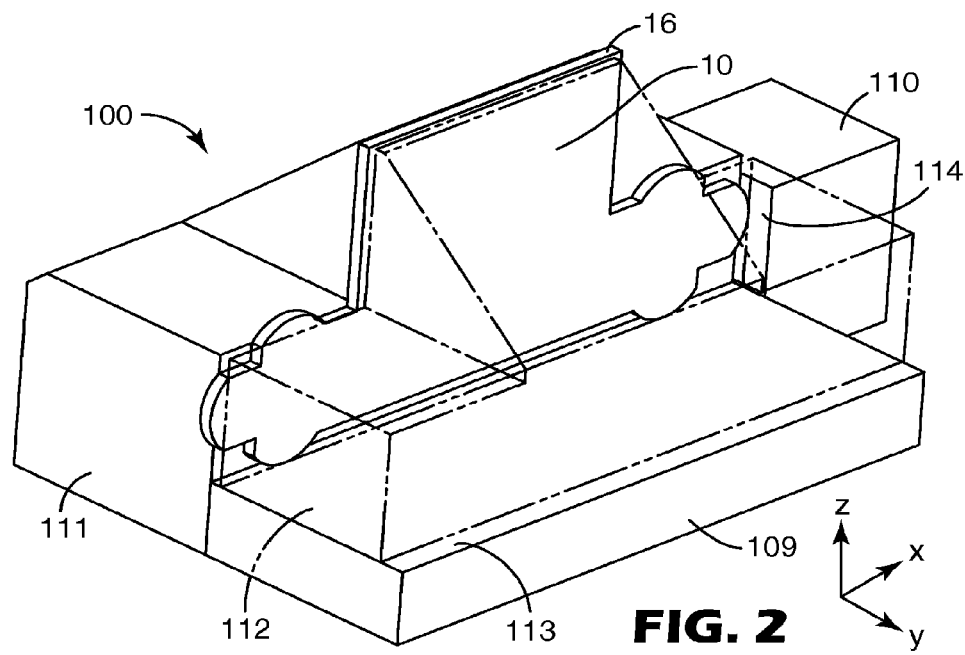
FIG. 2 is a trimetric view of a single lamina in a fixture.

An exemplary machining fixture for a lamina and a lamina design having protrusions are depicted in FIGS. 1-2. The contact of radii 1 and 2 with planar surface 113 of the machining fixture 100 in combination with force acting upon radii 5 and 6 kinematically constrain the lamina in the z-axis direction (i.e. z translation) as well as rotation about the y-axis. Further, the contact of radius 3 with planar surface 114 of the machining fixture in combination with force acting upon radius 4 kinematically constrains the lamina in the x-axis direction (i.e. x translation). Surface 14 of the lamina contacts a surface (not shown) of jaw 111 of the machining fixture 100 to constrain the lamina in the remaining three degrees of freedom, i.e. y translation, rotation about x, and rotation about z. Accordingly, in preferred embodiments, the lamina is kinematically constrained in three degrees of freedom, i.e. x translation, z translation and rotation about y in combination with non-kinematic surface contact of the lamina for constraint in the remaining three degrees of freedom. The lamina may optionally also be kinematically constrained in y translation, rotation about z, and rotation about x, particularly in the case of a lamina of sufficient thickness to prevent unacceptable flexural distortion resulting from these constraints.

The present inventors have discovered that kinematic positioning is advantageous during the machining of a lamina for the purpose of locating small cube corner structures on microstructured lamina(e) in a repeatable manner. Kinematic positioning is advantageous for the placement of microstructured laminae relative to each other in an assembly fixture such that positioning errors approach the precision of the groove-forming machine. Although the methods and apparatus described herein are particularly well suited for machining cube corner microstructures on the edge of a lamina, such methods and apparatus are believed suitable for use in the machining of other types of microstructures (e.g. hook and loop fasteners) that utilize laminae having a microstructured surface (e.g. edge).

In general, the lamina may be comprised of any substrate suitable for forming directly machined grooves on the edge. Suitable substrates machine cleanly without burr formation, exhibit low ductility and low graininess and maintain dimensional accuracy after groove formation. A variety of machinable plastics or metals may be utilized. Suitable plastics comprise thermoplastic or thermoset materials such as acrylics or other materials. Machinable metals include aluminum, brass, copper electroless nickel, and alloys thereof. Preferred metals include non-ferrous metals. Suitable lamina material may be formed into sheets by for example rolling casting chemical deposition, electro-deposition or forging. Preferred machining materials are typically chosen to minimize wear of the cutting tool during formation of the grooves. Other materials may also be suitable for laminae comprising other types of microstructures.

A lamina is a thin plate having length and height at least about 10 times its thickness (preferably at least 100, 200, 300, 400, 500 times its thickness). The invention is not limited to any particular dimensions of lamina(e). One of ordinary skill in the art appreciates the optimal dimensions of the lamina(e) are related to the flexural stiffness of the lamina, buckling stiffness, and ease of handling. Furthermore, in the case of laminae intended for use in the manufacture of retroreflective sheeting, optimal dimensions may also be constrained by the optical requirements of the final design (e.g. cube corner structures). The invention is generally advantageous for a lamina having a thickness of less than 0.25 inches (6.35 mm) and preferably less than 0.125 inches (3.175 mm). In the case of laminae suitable for use in molds for forming retroreflective sheeting, the thickness of each lamina is preferably less than about 0.020 inches (0.508 mm) and more preferably less than about 0.010 inches (0.254 mm). Typically, the thickness of such a lamina is at least about 0.001 inches (0.0254 mm) and more preferably at least about 0.003 inches (0.0762 mm). Such lamina(e) range in length from about 1 inch (25.4 mm) to about 20 inches (5.08 cm) and are typically less than 6 inches (15.24 cm). The height (i.e. the distance between edge 18 and working surface 16) of such lamina typically ranges from about 0.5 inches (12.7 mm) to about 3 inches (7.62 cm) and is more typically less than about 2 inches (5.08 cm).

The assembled laminae within a stack are typically of substantially the same size. The thickness, length and height of each lamina vary in accordance with customary machining tolerances. Although higher dimensional variation may be suitable for other uses, in the case of assembled laminae that are intended to be subject to electroforming from an aqueous solution, it is preferred that the variation in height from lamina to lamina is less than about +/−0.005 inches (0.127 mm), more preferably less than +/−0.0005 inches (0.0127 mm), and even more preferably less than +/−0.00005 inches (0.00127 mm). Further, the variation in length from lamina to lamina is preferably less than +/−0.0005 inches (0.0127 mm), more preferably less than +/−0.0001 inches (0.00254 mm) and even more preferably less than +/−0.00005 inches (0.00127 mm). The thickness tolerance within a lamina is preferably less than +/−0.002 inches (0.0508 mm), more preferably less than +/−0.0002 inches (0.00508) and even more preferably less than +/−0.0001 inches (0.00254 mm) particularly in the case of laminae for molds for the manufacture of retroreflective sheeting. To ensure repeatable positioning during the machining and assembly of the lamina, the faces of each lamina (i.e. faces 12 and 14) are preferably machined to an average surface roughness of less than about 0.00008 inches (0.0002 mm) and more preferably to less than 0.000004 inches (0.0001 mm).

The outside edges of the contact protrusions (e.g. 1, 2 and 3) typically have a peak to valley ($P_v$) surface roughness at most equal to the maximum intended positioning error during machining and/or assembly. Preferably, $P_v$ surface roughness for the contact protrusions is less than one third of the maximum intended positioning error and more preferably less than about one sixth of the maximum intended positioning error. Accordingly, for a maximum positioning error of +/−0.0001 inches (0.0025 mm) the $P_v$ surface roughness of the protrusions is preferably about 0.000016 inches (0.0004 mm) or less.

In the case of rounded protrusions, the size of contact radii 1, 2 and 3 is preferably chosen based on the magnitude of force acting upon the contact radii in relation to the composition of the lamina protrusion, and the dimensions of the lamina; the size of the contact radii is chosen to reduce stress, prevent deformation and minimize contact with the fixture as previously described. A suitable contact radii 1, 2 and 3 of a lamina suitable for use in the manufacture of retroreflective sheeting comprised of brass having a thickness of 0.010 inches (0.254 mm), a length of 6 inches (15 cm) and a height of 2 inches (5 cm), with a 2 pound (0.9 kg) applied force is about 10 inches.

Figure 3:
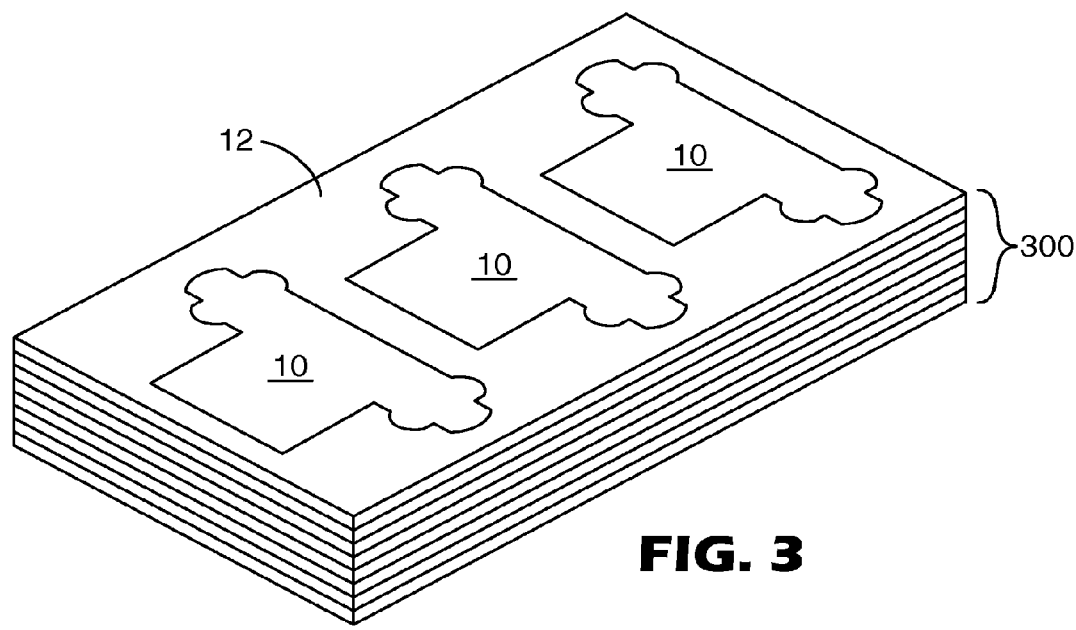
FIG. 3 is a trimetric view of multiple laminae being cut from a stack of sheets.

A preferred method of making laminae, with reference to FIG. 3, comprises facing major surfaces 12 and 14 (not shown) of two or more sheets with for example a diamond turning machine to the desired surface roughness and thickness tolerance as just described, assembling the sheets into a stack 300 and then cutting the perimeter shape of the lamina through the stack. The facing of the major surfaces may be accomplished for example by grinding, lapping, milling and preferably by diamond machining. Facing of sheets is more efficient than facing individual lamina and typically results in better thickness uniformity, especially near the edges. Further, cutting more than one lamina concurrently is more efficient than cutting laminae individually and typically produces better uniformity of the lamina dimensions. The number of sheets that can be concurrently cut from a stack depends upon the thickness of the individual sheets and the ability to hold the stack during cutting. For sheets having a thickness of about 0.010 inches (0.254 mm), at least 80 sheets (e.g. 100) can be assembled into a stack for concurrent cutting of laminae. If the length and height of the sheets are only slightly larger than the intended length and height of the lamina, one lamina may be cut from each sheet. Typically however, the size of the sheets is sufficiently larger such that 5 or more laminae are cut from each sheet. The perimeter shape can be cut from the stack with any means suitable for providing laminae having the previously described dimensional variation. It is preferred however that the cutting of the laminae from the stack is accomplished by means of wire electro-discharge machining ("wire EDM"). In doing so the $P_v$ surface roughness of the edges as well as the height and length tolerances are within the target range without subsequent facing of the peripheral edges of the laminae. Alternatively, however, two or more laminae may be cut from a stack concurrently with a less precise cutting means. The lamina and particularly working surface 16 of FIG. 1 may then be machined to the desired tolerance while positioned in the machining fixture immediately prior to forming the grooves.

In FIG. 2, lamina 10 is mounted in machining fixture 100 having jaws 111 and 112 with an adjustable opening between the jaws. The opening is bound by two parallel planar surfaces and a perpendicular planar surface 113 of base 109. The machining fixture further comprises a stop 110, having planar surface 114 that contacts radius 3 of the lamina, whereas planar surface 113 contacts radii 1 and 2 of the lamina. The machining fixture preferably applies constant orthogonal forces to lamina radii 4, 5, and 6 in order to maintain the contact of radii 1, 2 and 3 with their respective planar surfaces. Such force may be applied by any suitable means such as mechanical threads, springs, levers as well as fluid pressure pistons. More generally the force need not be constant nor applied directly to protrusions 4, 5 and 6 although this is preferred.

Surface 14 of the lamina is held in contact (e.g. non-kinematically) with the first parallel surface of jaw 111. Optionally, yet preferably, surface 12 of the lamina is concurrently held in contact with the second parallel surface of jaw 112. The jaws may be held in place with any suitable means including mechanical threads, springs, fluid pressure pistons, levers and preferably by means of a vacuum acting through holes or channels in jaws 111 and 112. Applying opposing vacuums in such a manner increases the flexural stiffness of the lamina so as to prevent it from peeling away from the primary vacuum surface. The machining fixture may be made from any material. The aforementioned kinematically contacted planar surfaces 114 and 113 are preferably constructed of a wear resistant, diamond-machinable material and subsequently diamond machined to a mirror finish. Preferably, the planar surfaces of the fixture that contact the lamina are made of a material having similar or greater hardness than the material of the lamina. Alternatively, however, the planar contact surfaces of the fixture may comprise a softer material for the purposes of reducing stress on the lamina contact points by absorbing energy. However, such materials typically have less wear resistance. It is preferred that each of the planar surfaces of the machining fixture (114 and 113) that contact the lamina protrusions have a surface roughness at most equal to the surface roughness of the edges of the lamina as previously described.

Following the kinematic positioning of the lamina in the machining fixture such that an edge portion (narrow substantially planar portion such as working surface 16) is exposed, the method of the invention comprises machining the edge portion of the lamina. Accordingly, the machined surface portion spans the thickness of the lamina. As used herein, "machining" refers to cutting, shaping, milling, grinding or finishing by a machine tool. Although kinematic positioning may also be employed for machining other surfaces of the lamina, e.g. major surfaces 12 and/or 14, the methods and apparatus of the present invention are particularly suitable for machining cube corner microstructures on the exposed edge portion of the lamina, i.e. working surface 16 by forming a plurality of V-shaped grooves.

With reference to FIG. 1, lamina 10 includes a first major surface 12 and an opposing second major surface 14. Lamina 10 further includes working surface 16 and an opposing bottom surface 18 extending between first major surface 12 and second major surface 14. Lamina 10 further includes a first end surface 20 and an opposing second end surface 22.

Lamina 10 can be characterized in three-dimensional space with the same superimposed Cartesian coordinate system as employed for the purpose of describing the kinematic positioning. A first reference plane 24 is centered between major surfaces 12 and 14. First reference plane 24, referred to as the x-z plane, has the y-axis as its normal vector. A second reference plane 26, referred to as the x-y plane, extends substantially coplanar with working surface 16 of lamina 10 and has the z-axis as its normal vector. A third reference plane 28, referred to as the y-z plane, is centered between first end surface 20 and second end surface 22 and has the x-axis as its normal vector.

In the method of machining lamina(e) comprising cube corner microstructures a first groove set, an optional second groove set, and preferably a third primary groove are formed with a groove-forming machine. As used herein, the term "groove set" refers to grooves formed in working surface 16 of the lamina 10 that range from being nominally parallel to non-parallel to within 1° to particular reference planes as will subsequently be described and/or nominally parallel to non-parallel to within 1° to the adjacent grooves in the groove set. Nominally parallel grooves are grooves wherein no purposeful variation has been introduced within the degree of precision of the groove-forming machine. The precision of the groove angle is typically at least as precise as +/−2 arc minutes (+/−0.033 degrees), preferably at least as precise as +/−1 arc minute (+/−0.017 degrees), and more preferably at least at precise as +/−½ arc minute (+/−0.0083 degrees) and most preferably at least at precise as +/−¼ arc minute (+/−0.0042 degrees) over the length of the cut (e.g. the thickness of the lamina). The grooves of the groove set may also comprise small purposeful variations for the purpose of improving the retroreflected divergence profile such as included angle errors, and/or skew, and/or inclination as will subsequently be described in greater detail.

In general, the first groove set comprises a plurality of grooves having respective groove vertices that intersect the first major surface 12 and working surface 16 of lamina. Although working surface 16 may include a portion that remains unaltered (i.e. unstructured), it is preferred that working surface 16 is substantially free of unstructured surface portions.

The second groove set, (i.e. when present) comprises a plurality of grooves having respective groove vertices that intersect the first major surface 14 and the working surface 16 of the lamina. The first and second groove sets intersect approximately along a first reference plane 24 to form a structured surface including a plurality of alternating peaks and v-shaped valleys.

Both the first and second groove sets may also be referred to herein as "side grooves". As used herein, side groove refers to a groove that ranges from being nominally parallel to reference plane 28 to nonparallel to reference plane 28 to within 1°. Alternatively or in addition thereto, individual grooves within a side groove set may also ranges from being nominally parallel to each other to non-parallel to within 1°. Side grooves may optionally be perpendicular to reference plane 24 to this same degree of deviation.

Although the third face of the elements may comprise working surface 12 or 14, such as described for example in EP 0 844 056 A1 and U.S. Pat. No. 6,010,609 (Mimura), the lamina preferably comprises a primary groove face that extends substantially the full length of the lamina. Formation of a primary groove face results in a structured surface that includes a plurality of cube corner elements having three perpendicular or approximately perpendicular optical faces on the lamina. Typically, the intersection of such primary groove face with either working surface 12 or 14 is nominally parallel to reference plane 26. A single lamina may have a single primary groove face, a pair of groove faces on opposing sides and/or a primary groove along the intersection of working surface 16 with reference plane 24 that concurrently provides a pair of primary groove faces.

A pair of single laminae with opposing orientations and preferably multiple laminae with opposing orientations are typically assembled such that their respective primary groove faces form a primary groove.

The invention is suitable for many optical designs known in the art. Illustrative optical designs are described in for example EP 0 844 056 A1 and U.S. Pat. No. 6,010,609 (Mimura); U.S. Pat. No. 6,015,214 (Heenan); U.S. Pat. No. 5,981,032 (Smith); U.S. Pat. No. 6,159,407 (Krinke) and U.S. Pat. No. 6,257,860 (Luttrell); all of which are incorporated herein by reference.

The side grooves may comprise skew and/or inclination in order to improve the divergence profile of the retroreflective sheeting. As used herein "skew" refers to the deviation from parallel with reference to reference plane 28. "Inclination" refers to the deviation in slope in reference plane 28 of a particular side groove from the nominal orthogonal slope (i.e. the slope of the vector normal to the primary groove surface). Further details concerning the advantages of skewed and/or inclined side grooves are found in U.S. patent application Ser. No. 60/452,464, filed Mar. 6, 2003, titled "Lamina Comprising Cube Corner Elements and Retroreflective Sheeting" filed on the same day as the present application, incorporated herein by reference.

While the change in shape of a single cube corner element due to skew and/or inclination is small with respect to a single element (e.g. limited primarily to changes in the dihedral angles), it is evident that forming skewed and/or inclined grooves in a stack of laminae may be problematic. Since the side grooves deviate from parallel up to as much as 1°, significantly varying cube geometries may be produced across the stack. These variations increase as the stack size increases. The calculated maximum number of laminae that can be machined concurrently (i.e. in a stack) without creating significantly varying cube geometries is as few as two laminae (e.g. for 1° skew, 0.020 inch (0.508 mm) thick lamina with 0.002 inch (0.0508 mm) side groove spacing). Accordingly, the methods and apparatus described herein are particularly useful for machining an individual lamina wherein the side grooves comprise "skew" and/or "inclination".

Skew and/or inclination provides cubes with a variety of controlled dihedral angle errors or multiple non-orthogonality (MNO) and thus improves the divergence profile of the finished product. As used herein "skew" refers to the deviation from parallel with reference to reference plane 28.

Figure 6:
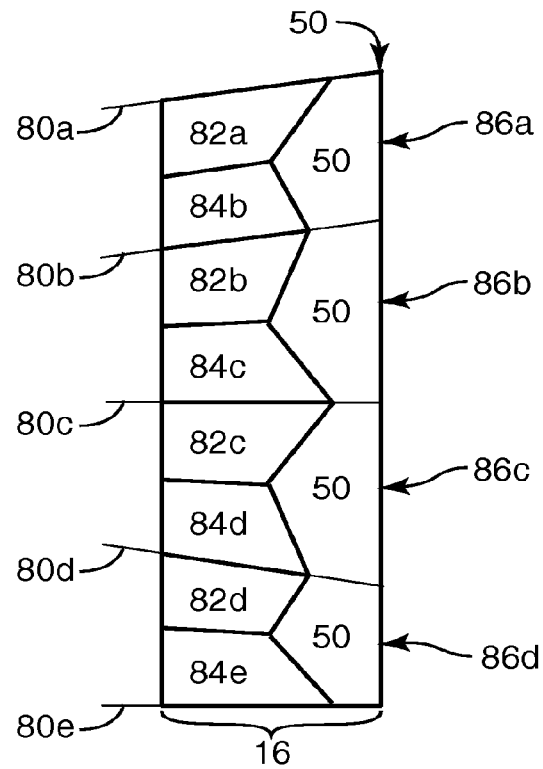
FIG. 6 depicts a top plan view of a lamina having skewed side grooves.
Figure 7:
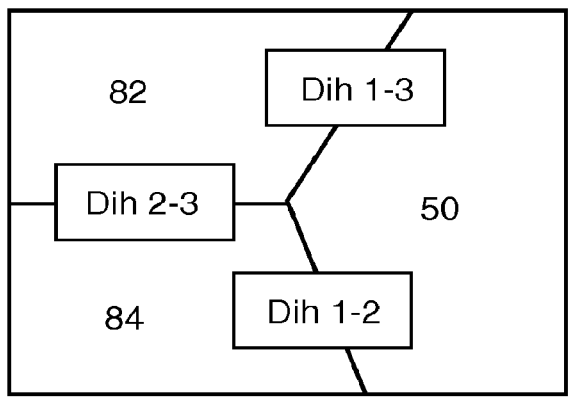
FIG. 7 depicts each of the dihedral angles of a cube corner element.
Figure 8:
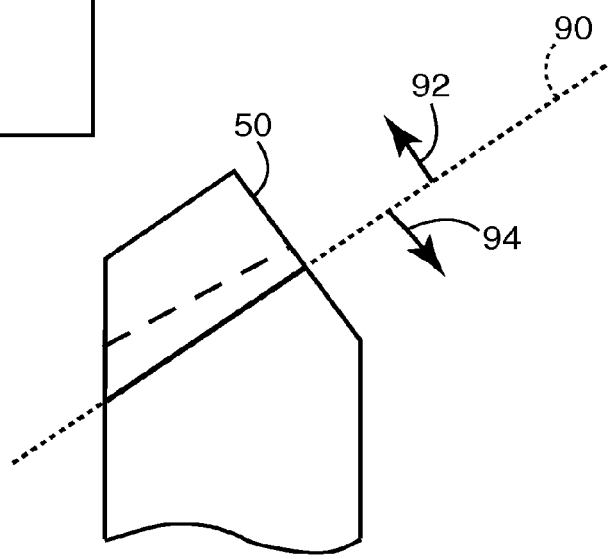
FIG. 8 depicts a side view of a cube corner element of a lamina depicting positive and negative inclination.

FIG. 6 shows an exaggerated example in plan view of a single lamina with one row of cube corner elements comprising skewed grooves. Side grooves 80a and 80b are cut with positive skew, grooves 80c and 80e without skew, and groove 80d with negative skew. The path of the side grooves 80 has been extended in FIG. 6 for clarity. Provided side grooves 80a, 80c, and 80e have the same included angle (e.g. 75°, first groove sub-set), the same cutting tool or diamond can be used to form all of these grooves. Further, if the alternating grooves, namely 80b and 80d have the same included angle (e.g. 105°, second groove sub-set) 80b and 80d can be cut with a second diamond. The primary groove face 50 may also be cut with one of these diamonds if the primary groove half angle is sufficiently close to the side groove half angle for the first or second sub-sets. Optionally, one of the cutting tools may be rotated during cutting of the primary groove face in order to achieve the correct primary groove half angle. The primary groove face is preferably aligned with the side of the lamina. Thus, the entire lamina can be cut incorporating MNO with the use of only two diamonds. Within each groove set skew can be easily varied during machining to produce a range of dihedral angles. Cube corners in general have three dihedral angles attributed to the intersections of the three cube faces. The deviation of these angles from 90° is commonly termed the dihedral angle error and may be designated by dihedral 1-2, dihedral 1-3, and dihedral 2-3. In one naming convention, as depicted in FIG. 7, cube dihedral angle 1-3 is formed by the intersection of groove surface 82 with primary groove face 50, cube dihedral 1-2 is formed by the intersection of groove surface 84 with primary groove face 50, and cube dihedral 2-3 is formed by the intersection of groove surface 84 with groove surface 82. For a given groove, positive skew (80a, 80b) results in decreasing dihedral 1-3 and increasing dihedral 1-2 while negative skew results in increasing dihedral 1-3 and decreasing dihedral 1-2.

For example, with reference to FIG. 6 four different cubes are formed. The first cube 86a has groove surfaces (i.e. faces) 82a and 84b, the second cube 86b groove surfaces 82b and 84c, the third cube 86c groove surfaces 82c and 84d, and the fourth cube 86d has groove surfaces 82d and 84e. The intersection of groove surfaces 82a, 82b, and 84d with groove face 50 are less than 90°, whereas the intersection of groove surfaces 84b and 82d with groove face 50 are greater than 90°. The intersection of groove surfaces 82c, 84c, and 84e with groove face 50 are 90° since grooves 80c and 80e are without skew. The preceding discussion assumes that the inclination (as will subsequently defined) is the same for all the side grooves in FIG. 6 and equals zero. The (e.g. PG) cube corner elements are trapezoids or parallelograms (i.e. exclusive of rectangles) in plan view shape as a result of using skewed grooves during machining.

Alternatively, or in addition to the features previously described, the side grooves may comprise positive or negative inclination. "Inclination" refers to the deviation in slope in reference plane 28 of a particular side groove from the nominal orthogonal slope (i.e. the slope of the vector normal to the primary groove surface). The direction of a side groove is defined by a vector aligned with the vertex of said groove.

Orthogonal slope is defined as the slope in which the vertex 90 of a groove would be parallel to the normal vector of groove face 50 (normal to groove face 50) for skew equal to zero. In one possible naming convention, positive inclination 92 results in decreasing both dihedral 1-3 and dihedral 1-2 for a given side groove while negative inclination 94 results in increasing both dihedral 1-3 and dihedral 1-2.

Combining skew and/or inclination during machining provides significant flexibility in varying the dihedral angle errors of the cube corner elements on a given lamina. Such flexibility is independent of cant. Accordingly skew and/or inclination may be employed with uncanted cubes, forward canted cubes, backward canted cubes, as well as sideways canted cubes. The use of skew and/or inclination provides a distinct advantage as it can be introduced during the machining of individual lamina without changing the tool (e.g. diamond) used to cut the side grooves. This can significantly reduce machining time as it typically can take hours to correctly set angles after a tool change. Furthermore, dihedral 1-2 and dihedral 1-3 may be varied in opposition using skew and/or inclination. "Varied in opposition" as used herein is defined as intentionally providing within a given cube corner on a lamina dihedral 1-2 and 1-3 errors (differences from 90°) that differ in magnitude by at least 1 arc minute and/or sign more preferably by at least ½ arc minutes, and most preferably by at least ¼ arc minutes. Further, the (e.g. side) grooves may comprise a variety of different components of skew and/or inclination along a single lamina.

While being constrained kinematically, preferably in at least three degrees of freedom, grooves are formed on the exposed edge(s) of the lamina(e) with a groove-forming machine. Examples of direct machining techniques include flycutting, milling, grinding and ruling such as described in U.S. Pat. No. 4,588,258 (Hoopman) and U.S. Pat. No. 3,712,706 (Stamm), which disclose single or multiple passes of a machine tool having two opposing cutting surfaces for cutting grooves to form cube-corner optical faces in a substrate. Preferably a diamond tool is utilized to form the grooves.

The V-shaped grooves are preferably formed with a diamond-tooling machine that is capable of forming each groove with fine precision. Moore Special Tool Company, Bridgeport, Conn.; Precitech, Keene, N.H.; and Aerotech Inc., Pittsburg, Pa., manufacture suitable machines for such purpose. Such machines typically include a laser interferometer-positioning device. A suitable precision rotary table is commercially available from AA Gage (Sterling Heights, Mich.); whereas a suitable micro-interferometer is commercially available from Zygo Corporation (Middlefield, Conn.) and Wyko (Tucson, Ariz.) a division of Veeco. The precision (i.e. point to point positioning) of the microstructure (e.g. groove vertices spacing and groove depth) is preferably at least as precise as +/−500 nm, more preferably at least as precise as +/−250 nm and most preferably at least as precise as +/−100 nm. The precision of the groove angle is at least as precise as +/−2 arc minutes (+/−0.033 degrees), more preferably at least as precise as +/−1 arc minute (+/−0.017 degrees), even more preferably at least at precise as +/−½ arc minute (+/−0.0083 degrees), and most preferably at least as precise as +/−¼ arc minute (+/−0.0042 degrees) over the length of the cut (e.g. the thickness of the lamina). Further, the resolution (i.e. ability of groove forming machine to detect current axis position) is typically at least about 10% of the precision. Hence, for a precision of +/−100 nm, the resolution is at least +/−10 nm. Over short distances (i.e. 10 adjacent parallel grooves), the precision is approximately equal to the resolution. In order to consistently form a plurality of grooves of such fine accuracy over duration of time, the temperature of the process is maintained within +/−0.1° C. and preferably within +/−0.01° C.

The diamond tools suitable for use are of high quality such as diamond tools that can be purchased from K & Y Diamond (Mooers, N.Y.) or Chardon Tool (Chardon, Ohio). In particular, suitable diamond tools are scratch free within 0.010 inches (0.254 mm) of the tip, as can be evaluated with a 2000× white light microscope. Typically, the tip of the diamond has a planar portion ranging in size from about 0.00003 inches (0.000762 mm) to about 0.00005 inches (0.001270 mm). Further, the surface finish of suitable diamond tools preferably have a roughness average of less than about 3 nm and a peak to valley roughness of less than about 10 nm. The surface finish can be evaluated by forming a test cut in a machinable substrate and evaluating the test cut with a micro-interferometer, such as can be purchased from Wyko (Tucson, Ariz.), a division of Veeco.

Working surface 16 of the lamina is microstructured, meaning the lateral dimension of the structures (e.g. cube corner elements) preferably ranges from 0.0005 inches (0.0127 mm) to 0.25 inches (6.35 mm). As used herein, "lateral dimension" refers to the size of the structures as measured between opposing sides or features (e.g. the distance between the groove vertices of adjacent side grooves or the lamina thickness). The lateral dimension of the elements is preferably less than 0.015 inches (0.381 mm), more preferably less than 0.010 inches (0.254 mm), and most preferably less than about 0.006 inches (0.1524 mm).

Once the edge of each individual lamina has been machined with the desired microstructure, a plurality of laminae are stacked in the desired configuration. Typically, in the case of cube corner microstructures, the laminae are stacked such that the cubes on a first lamina are in an opposing cube orientation relative to the adjacent lamina.

The machining fixture and assembly fixture share the common features of comprising two opposing parallel surfaces connected to a perpendicular base support. The opposing parallel surfaces have an adjustable opening therebetween. Both fixtures also have a means for retracting and advancing at least one of the opposing surfaces for receipt of a lamina and a means for kinematic positioning of an individual lamina. Further, both fixtures are preferably equipped with a suitable means for verifying the correct placement of the lamina(e) such as contact (e.g. probe) and non-contact (e.g. microscope) instruments. Whereas the machining fixture is designed for kinematic positioning of a single lamina, such positioning being temporarily fixed while the desired microstructure is formed on the exposed edge of the lamina(e), the assembly fixture is designed for kinematic positioning of each lamina in a stack.

Figure 4:
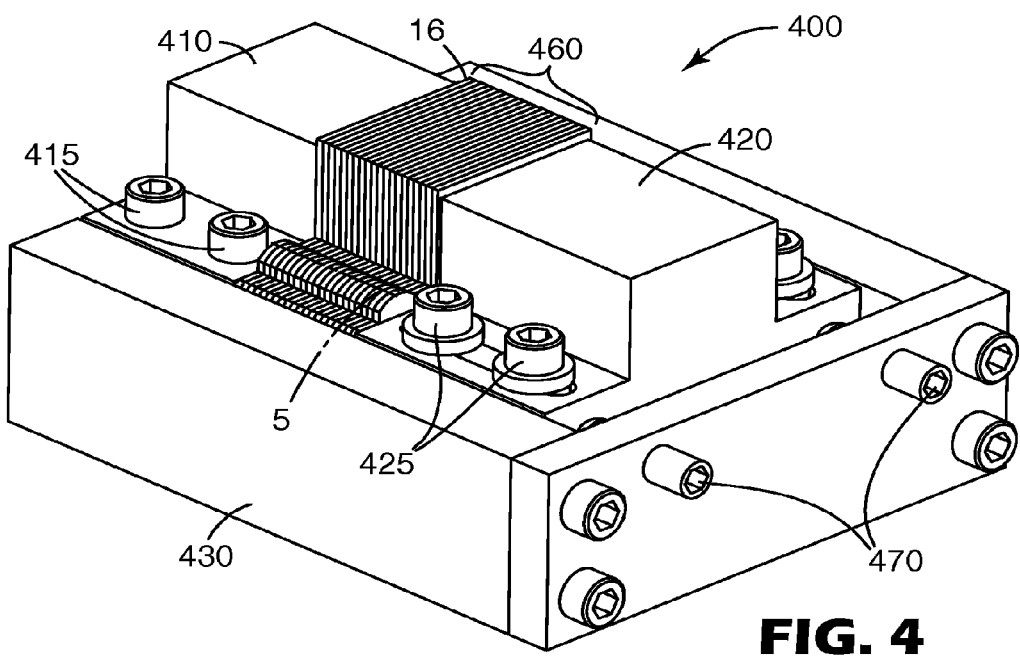
FIG. 4 is a trimetric view of an assembled stack of laminae provided in an exemplary assembly fixture.

With reference to FIG. 4, a stack of laminae 460 comprising a microstructured surface portion are constrained between a first (e.g. fixed) jaw 410 and a second (e.g. movable) jaw 420 in assembly fixture 400. The parallel surfaces of the jaw that (i.e. non-kinematically) contact major surfaces 12 and 14 of the lamina in combination with the perpendicular surface of base 430 form a precision-machined pocket, the length of the pocket being slightly greater than the longest lamina of the eventual stack, (e.g. 0.0001 inches (0.00254 mm) greater). The fixed jaw 410 is fastened rigidly to the base 430 with screws 415 such that it is perpendicular to the pocket edges preferably to within 0.0005 inches (0.0127 mm) and more preferably 0.0001 inches (0.00254 mm). The moving jaw 420 is advanced or retracted and fastened rigidly with screws–25 at a position that is slightly wider than the width of the eventual assembled stack. The surfaces of the pocket that contact the protrusions of the lamina (i.e. contact radii 1, 2 and 3) are planar, e.g. to within 0.0001 inches (0.00254 mm). Although the depicted base and jaws each comprise a single part, they may alternatively be constructed of multiple parts that are precisely arranged to achieve these same tolerances.

During the assembly of the lamina, care is taken to ensure that the assembly fixture and lamina(e) are sufficiently clean to avoid positioning errors that could arise as a result of dirt and other organic or inorganic contaminants. In doing so, the contact surfaces of the assembly fixture as well as each lamina is washed with suitable solvents, soap solutions and/or deionized water prior to inserting the lamina into the assembly fixture. Further, the assembly is preferably conducted in a clean room.

Lamina(e) are inserted into the pocket, preferably but not necessarily one at a time, such that they accumulate from the fixed jaw towards the moving jaw. The kinematic constraints imposed on the lamina by the assembly fixture closely approximate those of the machining fixture. Moving jaw 420 comprises a two-stage device that maintains constant y-axis force on the stack as well as intermittently creates a gap in the y-axis direction for subsequent laminae to be inserted. The constant force of the two-stage device may be provided by any suitable mechanical or manual means, but preferably by means of pneumatic pistons. The first stage of the device allows a lamina to be inserted towards the bottom of the pocket a distance approximately equal to ½ of the height of the lamina. The second stage of the device allows this lamina to be inserted the remaining distance towards the bottom of the pocket. After each lamina is inserted into the stack, the lamina is forced, by any suitable mechanical or manual means, in the x-direction such that radius 3 contacts its corresponding edge of the pocket and also is forced in the z-direction such that radii 1 and 2 contact the bottom of the pocket. As the assembly process takes place, lamina positions are measured to verify their proper location and if necessary, may be individually adjusted. Provided that the protrusions (i.e. comprising contact radii 5 and 6) opposing the positioning protrusion(s) are of a consistent height as previously described, one can verify the position of the laminae for example by running a probe along the top of the exposed protrusions. After the laminae are determined to be properly positioned, adjustment screws 470 are tightened such that they contact the moving jaw. Fastening screws 425 are then loosened slightly, thereby allow the moving jaw to be translated in the y-direction by means of moderate torque applied to the adjustment screws. The adjusted screws are then independently tightened until the proper pressure has been applied to the stack. The material used to construct the fixture and in particular those components in contact with the lamina (e) are chosen to have a coefficient of thermal expansion similar to that of the lamina material. The stack protrudes approximately 0.050 inches (1.27 mm) beyond the outside surfaces of the fixed and moving jaws providing a microstructured surface for replication.

It is preferred that the laminae are assembled in the same orientation as machined (e.g. all the laminae are orientated such that contact radius 3 contacts the same side surface of the assembly fixture). Alternatively, the laminae may be arranged such that adjacent laminae are in opposing orientations, e.g. every other lamina being positioned such that radius 4 kinematically contacts its respective side surface of the assembly fixture. Alternating the laminae in this manner is advantageous for minimizing the different types of optical designs cut into working surface 16. However such an assembly is surmised to be more difficult and less precise because larger errors arise from alternating the positioning of the laminae than from the forming of opposing structures with the groove-forming machine.

The kinematically positioned and assembled laminae may be used as a tool such as for an embossing tool as described in U.S. Pat. No. 4,486,363 (Pricone et al). Typically, however, the assembled laminae have a very small surface area and thus to obtain manufacturing efficiencies, the tool is replicated followed by seaming or tiling together the replicated copies in order to produce a substantially larger tool.

Figure 5:
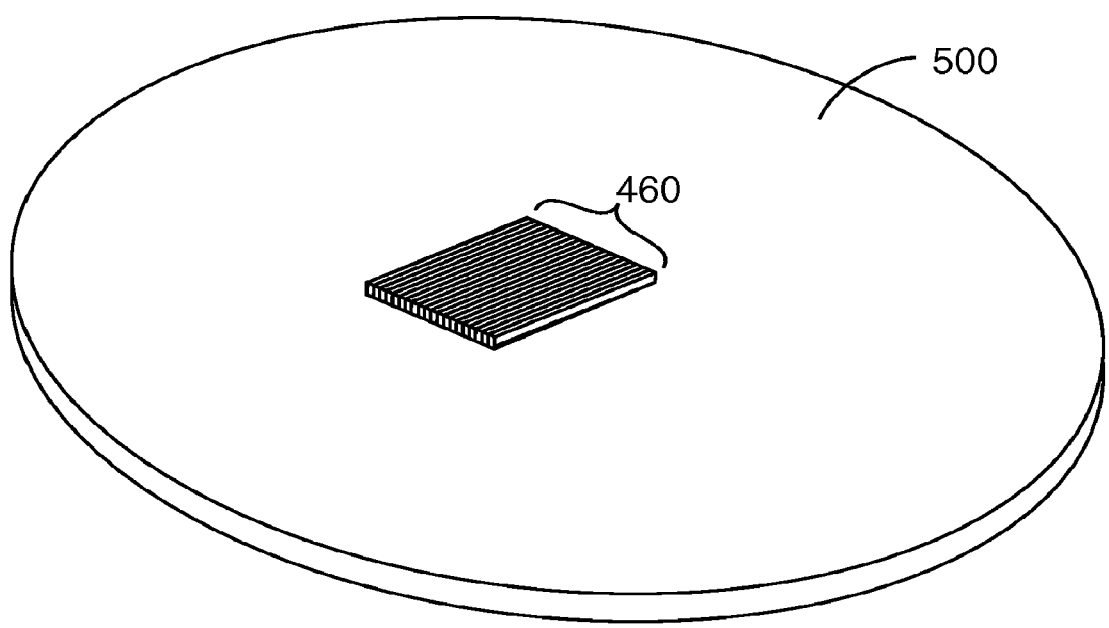
FIG. 5 is a trimetric view of an assembled stack of laminae and a coversheet.

In order to replicate the exposed microstructured surface, a 0.050 inch (1.27 mm) thick coversheet 500 is attached to the fixture such that the microstructured surfaces of the laminae are exposed and the remainder of the fixture is covered, as depicted in FIG. 5. Typically a conductive sheet such as stainless steel is machined (e.g. wire EDM) to have an opening slightly smaller than the size of the protruding microstructured surface of the stack. The coversheet preferably has a mirror finish on the back (not shown) for easy removal of the plating flash (e.g. very thin layer of electrodeposited material, typically with a thickness of less than about 0.0002 inches (0.00508 mm)) and is straight line sanded on the front to allow for one directional stripping of the electroformed tool. Preferably, the sanded lines are roughly parallel to the primary grooves of the laminae. The coversheet is preferably shrunk fit (e.g. thermally) onto the perimeter of the protruding portion of the stack in order to minimize flash at this boundary in the plated replica and fastened through the assembly fixture with for example studs welded to the back of the coversheet. The fasteners however do not extend through the coversheet to avoid electroplating of the fasteners. The microstructured surface of the laminae surrounded by the coversheet is placed in a nonconductive plating fixture.

Alternatively, the assembled stack may comprise a peripheral planar surface portion. This is accomplished by inserting unstructured laminae at both ends of the stack in combination with leaving a portion of working surface 16 unstructured on both ends. Provided that the peripheral planar portion is at least 0.125 inch (3.175 mm) wide around the perimeter of the stack, a cover sheet may not be required. In the absence of a coversheet, however, the geometry of the lamina stack as well as the assembly fixture is such that the electroformed replica can be released (i.e. the replica does not interlock with the fixture).

The exposed microstructured surface, also referred to as a "master mold" is then replicated using any suitable technique such as conventional nickel electroforming to produce a tool of a desired size for forming microstructured sheeting. Preferably, the stack of assembled laminae is kept wet prior to initiating electroforming and each replica is removed from the stack of assembled laminae prior to drying of the plating solution that may have seeped between the major surfaces of the lamina stack. The stack is kept continuously wet after each replica removal until plating is once again initiated. Multi-generational positive and negative copy tools are thus formed, such tools having substantially the same degree of precise cube formation as the master. Electroforming techniques such as described in U.S. Pat. No. 4,478,769 and U.S Pat. No. 5,156,863 (Pricone) as well as U.S. Pat. No. 6,159,407 (Krinke) are known. A plurality of replications are often joined together for example by welding such as described in U.S. Pat. No. 6,322,652 (Paulson). The resulting tooling may then be employed for forming cube corner retroreflective sheeting by processes such as embossing, extruding, or cast-and-curing, as known in the art.

Patents and patent applications disclosed herein are hereby incorporated by reference as if individually incorporated. It is to be understood that the above description is intended to be illustrative, and not restrictive. Various modifications and alterations of this invention will become apparent to those skilled in the art from the foregoing description without departing from the scope and the spirit of this invention, and it should be understood that this invention is not to be unduly limited to the illustrative embodiments set forth herein.

What is claimed is:

1. A method of assembling lamina comprising:
providing a lamina comprising a microstructured edge wherein the microstructured edge comprises a plurality of side grooves and the side grooves comprise different components of skew, different components of inclination, or a combination thereof;
kinematically positioning individual lamina in a fixture forming a stack; and
maintaining the position of a plurality of laminae in the stack such that the microstructured edges of the laminae form a microstructured surface.

2. The method of claim 1 wherein the lamina has a thickness ranging from 0.002 inches to 0.020 inches.

3. The method of claim 1 wherein the lamina has a thickness tolerance of +/−0.002 inches.

4. The method of claim 1 wherein the lamina has a thickness tolerance of +/−0.0002 inches.

5. The method of claim 1 wherein the microstructured edge comprises cube corner elements.

6. The method of claim 1 wherein the lamina comprise protrusions that are contacted during positioning.

7. The method of claim 1 wherein the lamina has two major surfaces orthogonal to the microstructured edge have a $P_v$ surface roughness of less than 0.000008 inches.

8. The method of claim 7 wherein the major surfaces of the lamina are machined with a diamond tool.

9. The method of claim 1 wherein the laminae vary in length by less than 0.001 inches.

10. The method of claim 1 wherein the laminae vary in length by less than 0.0001 inches.

11. The method of claim 1 wherein the laminae are stacked such that cubes on a first lamina are in an opposing cube orientation relative to an adjacent lamina.

12. A method of replicating a master mold comprising:
providing the stack of laminae in the fixture of claim 1;
attaching a conductive coversheet to the stack such that the microstructured surface is exposed; and
electroforming the exposed surface with an electroplating solution forming a replica.

13. The method of claim 12 further comprising removing the replica from the stack prior to drying of the plating solution.

14. The method of claim 12 further comprising shrink fitting the coversheet.

15. The method of claim 12 wherein the fixture comprises two opposing parallel surfaces connected by a perpendicular base support, said surfaces having an adjustable opening therebetween;
a means for retracting and advancing at least one of the opposing surfaces for receipt of a lamina; and
a means for kinematically positioning individual lamina.

16. The method of claim 15 wherein the fixture further comprises a means for maintaining the position of the laminae in a stack.

17. The method of claim 15 further comprising a means for verifying the position of the lamina.

18. The method of claim 15 wherein the positioning has a precision of +/−0.0001 inches or less.

19. The method of claim 15 wherein the opposing surfaces comprise vacuums.

20. The method of claim 15 wherein the fixture comprises protrusions suitable for kinematic positioning.

* * * * *